United States Patent [19]

Inoue et al.

[11] 4,139,825
[45] Feb. 13, 1979

[54] AUDIO FREQUENCY AMPLIFIER

[75] Inventors: Shigeki Inoue, Toyokawa; Isao Akitake, Yokohama, both of Japan

[73] Assignee: Hitachi, Ltd., Japan

[21] Appl. No.: 900,592

[22] Filed: Apr. 27, 1978

[30] Foreign Application Priority Data

May 4, 1977 [JP] Japan .................................. 52-50708
May 11, 1977 [JP] Japan .................................. 52-53088

[51] Int. Cl.² .......................................... H03F 3/183
[52] U.S. Cl. .................................. 330/260; 330/109; 330/294; 330/304
[58] Field of Search ............. 330/107, 109, 149, 294, 330/304, 260; 333/28 R, 28 T; 179/1 D

[56] References Cited

U.S. PATENT DOCUMENTS 4,032,855  6/1977  Holman .......................... 330/109 X Primary Examiner—James B. Mullins
Attorney, Agent, or Firm—Craig & Antonelli

[57] ABSTRACT

An equalizer amplifier of a negative feedback type comprises a common-emitter amplifier, an emitter follower amplifier cascade-connected thereto, and a negative feedback network connected between the output terminal of the emitter follower amplifier and the input terminal of the common-emitter amplifier with its negative feedback level increased as the frequency increases, wherein an inductance element is connected in series with the negative feedback circuit to attenuate harmful signals whose frequencies are higher than those of audio signals, thereby making large the ratio of signal to noise in the equalizer amplifier.

8 Claims, 5 Drawing Figures

AUDIO FREQUENCY AMPLIFIER

The present invention relates to a low frequency amplifier for amplifying a very small audio frequency signal, and more particularly to an equalizer amplifier for amplifying a signal recorded on a disco record or magnetic tape.

A magnetic cartridge for reproducing a signal recorded on a disc record, or magnetic head for reproducing a signal recorded on a magnetic tape produces an output signal, which has a very small amplitude. An amplifier for amplifying such a signal must have a large amplification degree and should not produce noise. The amplifier for amplifying the signal recorded on the disc record is provided with an equalizer circuit for compensating disc recording characteristics as shown, for example, by RIAA curves. The output signal from the magnetic cartridge is supplied to the equalizer amplifier provided with the equalizer circuit. In this respect, it is necessary to provide an equalizer amplifier free from noise in order to make large the ratio of signal to noise (hereinafter referred to as S/N ratio) of the low frequency amplifier.

In the prior art, the equalizer amplifier with transistors often comprises an equalizer circuit of negative feedback type, including a cascade-connected, common-emitter amplifier and an emitter follower amplifier whose emitter electrode is connected to the emitter electrode of the common-emitter amplifier to provide a negative feedback circuit. The negative feedback circuit has a time constant circuit so that the amplifier can have the reproduction characteristics such as RIAA curves. Further, the equalizer amplifier is so designed that the common-emitter amplifier may have a great gain, and a base resistor is connected between the input terminal and the base electrode of the common-emitter amplifier in the first stage to prevent oscillation. In order to provide the equalizer amplifier free from noise, it is necessary to use low noise-transistors and make small the resistance of the base resistor connected between the input terminal and the base electrode of the common-emitter amplifier in the first stage to reduce thermal noise developed from the base resistor.

On the other hand, the base resistor forms a low-pass filter in cooperation with a capacitor connected between the ground and the base electrode of the transistor to which the base resistor is connected. The small resistance of the base resistor, therefore, makes the cut-off frequency of the low-pass filter higher and allows no attenuation of harmful signals with high frequency. It occurs that the equalizer amplifier receives signals which include components of high frequencies from a portable transceiver or radio transmitter for amateurs. In this case, the mixed high frequency signals are peak-detected by a diode in the base-emitter junction of the common-emitter amplifier in the first stage and amplified to appear on the output terminal with a disadvantageous increase of noise if the low-pass filter with the base resistor has the cut-off frequency so high as not to allow the satisfactory attenuation of the mixed high frequency signals.

It is therefore an object of the present invention to provide a low frequency amplifier with low noise.

It is another object of the present invention to provide an equalizer amplifier with low noise.

It is a further object of the present invention to provide a low frequency amplifier with low noise and with harmful noise attenuated.

A low frequency amplifier according to the present invention may comprise a first amplifier having first and second input terminals and a first output terminal, and a second amplifier having a third input terminal and a second output terminal. The first input terminal of the first amplifier is supplied with preemphasis processed signals recorded on a disc record or magnetic tape, and the first output terminal of the first amplifier is connected to the third input terminal of the second amplifier to supply the second amplifier with an output signal from the first amplifier. Between the second output terminal of the second amplifier and the second input terminal of the first amplifier there is connected a negative feedback network, which as a deemphasis characteristic inverse to the preemphasis characteristic of the input signal. An inductance element is further connected between the second input terminal of the first amplifier and the negative feedback network. The inductance element has a small impedance for an input signal frequency, but a great impedance for harmful signals having a frequency higher than the input signal frequency, thereby by-passing the harmful signal or reducing the gain of the first amplifier relative to the harmful signal to attenuate the latter. This allows the attenuation of the harmful signal with the noiseless low frequency amplifier even if the resistance of the resistor is small which is connected to the input terminal of the first amplifier to prevent the oscillation.

The invention will now be described by way of example with reference to the drawings, in which.

Figure 1:
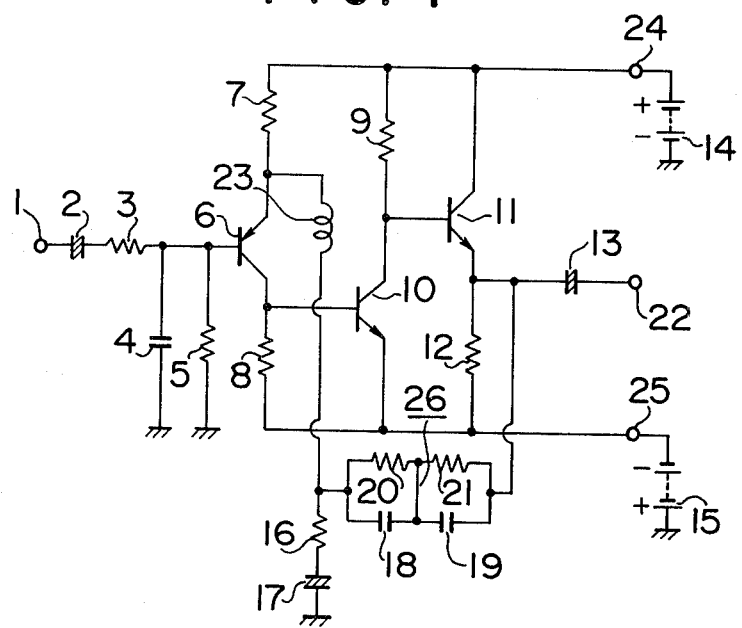
FIG. 1 is a circuit diagram showing one embodiment of a low frequency amplifier according to the present invention.

FIG. 1 is a circuit diagram showing one embodiment of a low frequency amplifier according to the present invention, in which an input terminal 1 is connected to the base electrode of a transistor 6, i.e., a first stage amplifier through series-connected capacitor 2 and resistor 3. The transistor 6 operates as a common-emitter amplifier and has its emitter electrode connected through a resistor 7 to a first power supply terminal 24 to which the positive electrode of a first DC supply is connected. The transistor 6 further has its collector electrode connected through a resistor 8 to a second power supply terminal 25 to which the negative electrode of a second DC supply 15 is connected. The transistor 6 has its base electrode grounded through a resistor 5 and a capacitor 4, and its collector electrode connected directly to the base electrode of a transistor 10, i.e. a second stage amplifier. The transistor 10 operates as a common-emitter amplifier, and has its emitter electrode connected directly to the second power supply terminal 25 and its collector electrode connected to the first power supply terminal 24 through a load resistor 9. A transistor 11 constituting a third stage amplifier operates as an emitter follower amplifier, and has its base electrode connected directly to the collector electrode of the transistor 10 and has its collector electrode connected directly to the first power supply terminal 24. The emiter electrode of the transistor 11 is connected to the second power supply terminal through a load resistor 12 and to an output terminal 22 through a capacitor 13. Between the emitter electrode of the transistor 11 and the emitter electrode of the transistor 6 there is connected a negative feedback network 26, which includes two series-connected resistors 20, 21 and two series-connected capacitors 18, 19 with each series circuit connected in parallel and with a junction between the resistors 20, 21 connected directly to a junction between the capacitors 18, 19. The negative feedback network 26 further includes series-connected resistor 16 and capacitor 17 with the capacitor 17 grounded at its one end and the resistor 16 connected at its one end to a junction between the resistor 20 and the capacitor 18. Between the junction of the resistor 20, capacitor 18 and resistor 16, and the emitter electrode of the transistor 6 there is connected an inductance element 23, which is a high frequency coil as shown by a coil symbol and has a small impedance for audio frequency signals and a great impedance for signals having a frequency higher than those of the audio frequency signals.

The negative feedback network 26 has its negative feedback level determined by the three resistors 16, 20, 21 and three capacitors 17, 18, 19. The negative feedback level is matched to the reproduction characteristics of the RIAA curves used for signal recording, for example, on the disc record with the negative feedback level increasing as the frequency becomes high. The transistor 6 has its base electrode supplied with an input signal and its emitter electrode supplied with a negative feedback signal with the base and emitter electrodes serving as input electrodes. In this respect, the transistor 6 includes two input electrodes each receiving a signal. The input terminal 1 receives a signal which is, for example, generated by reproducing a signal on the disc record by means of a magnetic cartridge. This signal is preemphasis processed according to the recording characteristics of the RIAA curves so that the signals in the high frequency range are emphasized in comparison with those in the low frequency range. The transistors 6, 10 operate as a common-emitter amplifier to attain a great gain for amplifying a very small signal from the magnetic cartridge to a signal with much greater amplitude. The transistor 11 works as an emitter follower amplifier to deliver, with a low output impedance, the signal amplified by the transistors 6, 10 from the output terminal 22. The transistor 6 operates as the common emitter amplifier to attain the great gain because of which it sometimes oscillates through stray capacitors. To prevent the oscillation, the base resistor 3 is connected between the input terminal 1 and the base electrode of the transistor 6.

In order to make large the S/N ratio of the low frequency amplifier comprising the three transistors 6, 10, 11, it is necessary to use low noise transistors for the three transistors 6, 10, 11 as well as to make the resistance of the resistor 3 so small as to reduce thermal noise from the resistor 3. The resistor 3, on the other hand, forms a low-pass filter together with the capacitor 4 with its cut-off frequency increasing as the resistance of the resistor 3 decreases. When, therefore, the input terminal 1 receives a harmful signal whose frequency is higher than that of the audio frequency signal, the low-pass filter cannot attenuate the harmful signal sufficiently.

The inductance element 23 connected between the emitter electrode of the transistor 6 and the negative feedback network 26 has its inductance so chosen that it has a small impedance for the audio frequency signal and a great impedance for the signal whose frequency is higher than that of the audio frequency signal. For this reason, the impedance of the emitter circuit in the transistor 6 for the audio frequency signal corresponds to that of a parallel connection of the resistors 7 and 16 because of the negligible impedance of the inductance element 23. For the harmful signal having a higher frequency than that of the audio frequency signal, on the other hand, the impedance of the emitter circuit in the transistor 6 almost equals the impedance of the parallel connection of the series circuit impedance of the inductance element 23 and the resistor 16 and the resistance of the resistor 7. As a result, for the harmful signal the impedance of the emitter circuit in the transistor 6 increases, and the gain of the transistor 6 decreases with the harmful signal attenuated. Thus, even if the resistance of the resistor 3 connected to the base electrode of the transistor 6 is made small with the cut-off frequency of the low-pass filter made great, the harmful signal is attenuated by the function of the inductance element 23. This allows the reduction of the thermal noise developed from the base resistor 3 and can provide a low frequency amplifier with a great S/N ratio.

Figure 2:
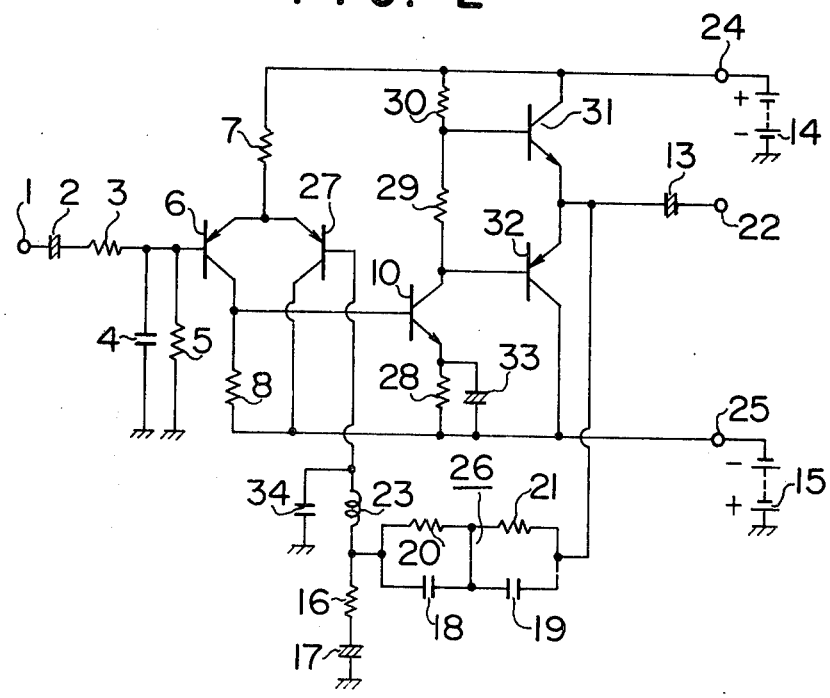
FIG. 2 is a circuit diagram showing another embodiment of a low frequency amplifier according to the present invention.

FIG. 2 is a circuit diagram showing another embodiment of a low frequency amplifier according to the present invention, in which the first stage amplifier constitutes a differential amplifier. The transistors 6 supplied with the input signal in FIG. 2 has its emitter electrode connected to the emitter electrode of a transistor 27, and further to a first power supply terminal 24 through the common emitter resistor 7. The transistor 6 forms the differential amplifier in combination with the transistor 27 with its output signal applied from the collector of the transistor 6 to the base electrode of the transistor 10. The emitter electrode of the transistor 10 is connected to a second power supply terminal 25 through an emitter resistor 28 and a bypass capacitor 33 connected in parallel therewith, and its collector electrode is connected to the first power supply terminal 24 through two series-connected resistors 29, 30.

The collector electrode of the transistor 10 is further connected to the base electrode of a transistor 32 with a junction between the two resistors 29, 30 connected to the base electrode of the transistor 31. The transistors 31, 32 constitute a complementary push-pull amplifier with their emitters 31, 32 connected to each other and its junction connected to the output terminal 22 through a capacitor 13. The collector electrode of a transistor 31 is connected to the first power supply terminal 24, and the collector electrode of the transistor 32 is connected to the second power supply terminal 25. Between the junction of the emitter electrodes of the transistors 31, 32 and the base electrode of the transistor 27 there is connected the negative feedback network 26, which includes an inductance element 23 connected between the base electrode of the transistor 27 and the junction of the two resistors 16, 20 and the capacitor 18. The base electrode of the transistor 27 is grounded through a capacitor 34.

The input signal applied to the input terminal 1 is amplified by a transistor 6 to generate at its collector an output signal, which is applied to the base electrode of the transistor 10 for amplification. The output signal from the transistor 10 is applied to the base electrodes of the two transistors 31, 32 for push-pull amplification, respectively. A part of the output signal from the transistors 31, 32 is fed back to the base electrode of the transistor 27 through the negative feedback network 26. The negative feedback network 26 has a particular frequency characteristic in which the negative feedback level changes with the frequency as is the case of the amplifier in FIG. 1 with the negative feedback level increasing and the total gain of the amplifier decreasing as the frequency becomes high.

The amplifier as shown in FIG. 2 is suitable for eliminating the harmful signal applied to the transistor 27 through the negative feedback circuit. If power from the power supply circuit is mixed with a harmful signal whose frequency is higher than that of the audio frequency signal applied to the input terminal 1, then the harmful signal is supplied to the negative feedback circuit through the transistors 31, 32 whose collector and emitter circuits have the low impedance, and then amplified by the transistors 6, 10. The negative feedback circuit of the amplifier in FIG. 2, however, includes the inductance element 23 and the capacitor 34. The inductance element 23 has its inductance so selected that it has a small impedance for the audio frequency signal and a great impedance for the harmful signal whose frequency is higher than that of the audio frequency signal. The inductance element 23 further constitutes a low-pass filter in combination with the capacitor 34. The harmful signal introduced into the negative feedback circuit is, therefore, by-passed by the inductance element 23 and the capacitor 34, and attenuated without any supply to the base electrode of the transistor 27. Thus, the low noise amplifier can be provided.

Figure 3:
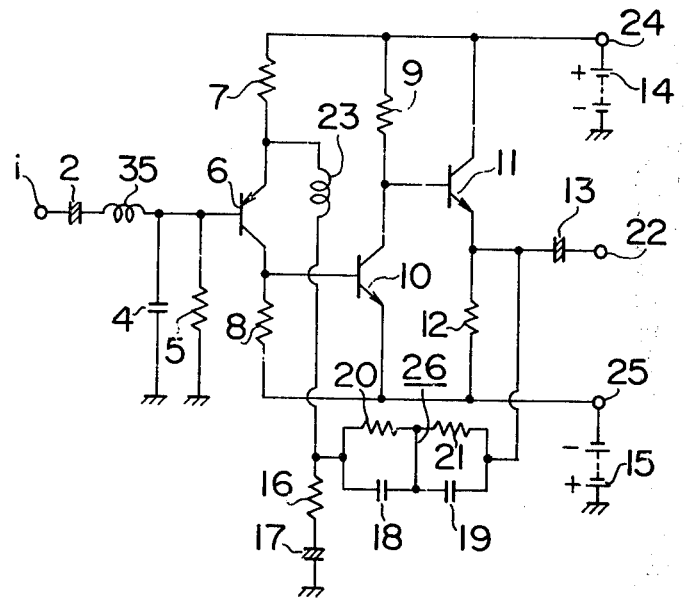
FIG. 3 is a circuit diagram showing another embodiment by further improvement of the low frequency amplifier in FIG. 1 according to the present invention.
Figure 4:
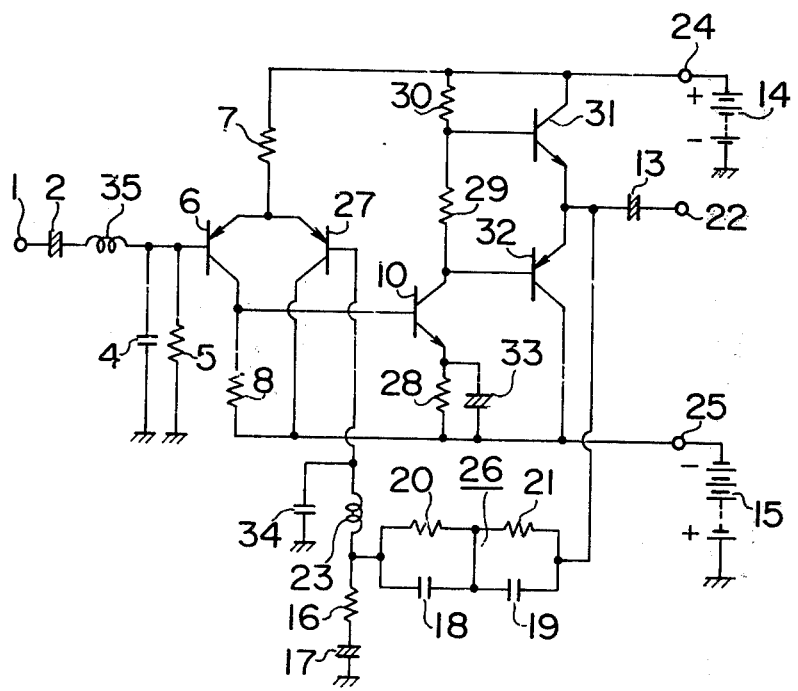
FIG. 4 is a circuit diagram showing another embodiment by further improvement of the low frequency amplifier in FIG. 2 according to the present invention.

FIGS. 3 and 4 show embodiments in which the low frequency amplifiers as shown in FIGS. 1 and 2 are improved. The low frequency amplifiers as shown in FIG. 3 and 4 include a second inductance element 35, respectively, which is connected between the input terminal 1 and the base electrode of the first stage transistor 6. The inductance element 35 has its inductance so chosen that it has an impedance substantially equal to the resistance of the resistor 3 in FIG. 1 for the audio frequency signal and an impedance larger than the resistance of the resistor 3 for the harmful signal whose frequency is higher than that of the audio frequency signal. The second inductance element 35 constitutes a low-pass filter in combination with the capacitor 4. The low-pass filter provides a low cut-off frequency for the harmful high frequency signals, thereby attenuating them. The amplifier shown in FIG. 3 attenuates the harmful signal with the aid of the second inductance element 35 and the capacitor 4, and simultaneously reduces the gain of the transistor 6 for the harmful signal by means of the first inductance element 23 connected to the negative feedback circuit. This allows the great attenuation of the harmful signal of high frequency and the improvement of the S/N ratio. The amplifier in FIG. 4, on the other hand, can attenuate harmful signals introduced not only from the input terminal 1 but also from the power supply circuit, thereby providing a low noise amplifier.

Figure 5:
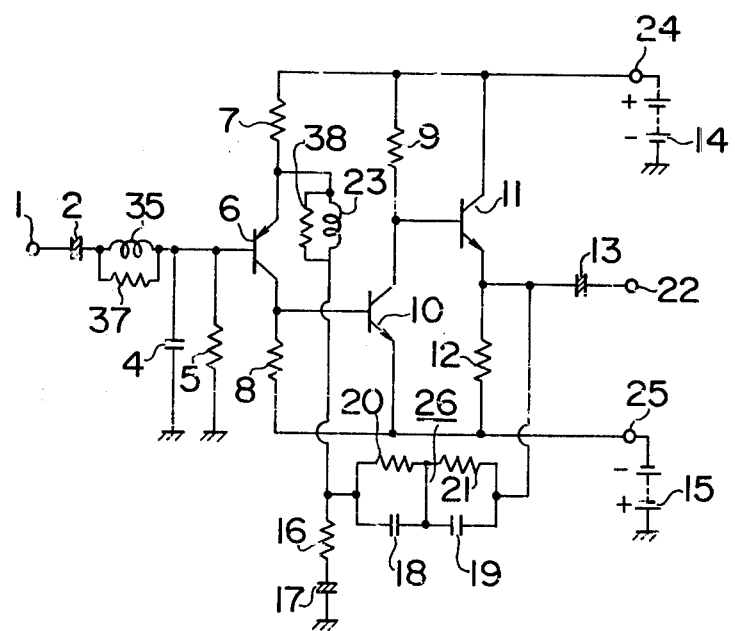
FIG. 5 is a circuit diagram showing another embodiment by further improvement of the low frequency amplifier in FIG. 1 according to the present invention.

The amplifier as shown in FIGS. 3 and 4 forms a resonant circuit with the second inductance element 35 and input capacitors 2, 4 when the input terminal 1 is erroneously short-circuited. There is thus the fear that an oscillation occurs if the resonant circuit has a high Q-value. FIG. 5 is a circuit diagram showing another embodiment for preventing such an oscillation. The amplifier in FIG. 5 is substantially the same as that in FIG. 3, but different therefrom in that the first inductance element 35 is connected in parallel with a resistor 38 and the second inductance element 35 in parallel with a resistor 37. The resistor 37 serves to damp the Q-value of the resonant circuit comprising the inductance element 35, capacitors 2, 4 and stray capacitors, and has its resistance so selected that the inductance element 35 may keep its function for the harmful high frequency signals. The first inductance element 23 together with its stray capacitor constitutes a resonant circuit, the Q-value of which is, however, damped by the resistor 38. The resistor 38 has its resistance selected similarly to the resistor 37 so that the inductance element 23 may not reduce the function to attenuate the harmful signal.

Also in the amplifiers as shown in FIGS. 2 and 4, the first and second inductance elements 23, 35 can be connected in parallel with resistors, respectively, to prevent the oscillation as the amplifier in FIG. 5 does.

The amplifier has been described as being three-staged with transistors, but may be with FETs and apparently has no limitation with respect to how many stages it has.

What we claim is:

1. A low frequency amplifier comprising:
    a first amplifier including a first input terminal receiving an input signal in the audio frequency range which has a frequency characteristic with its amplitude increasing as the frequency increases, a second input terminal receiving a negative feedback signal, and a first output terminal;
    a second amplifier including a second output terminal and a third input terminal which is connected to said first output terminal of said first amplifier to receive an output signal from said first amplifier;
    a negative feedback network connected between said second input terminal of said first amplifier and said second output terminal of said second amplifier and having its negative feedback level changed with a characteristic corresponding to the frequency characteristic of said input signal; and
    an inductance element connected between said second input terminal of said first amplifier and said negative feedback circuit and having an impedance which is small for said input signal and large for a signal whose frequency is higher than that of said input signal in the high frequency range.

2. An equalizer amplifier comprising:
    an input terminal receiving an input signal in the audio frequency range which has a frequency characteristic with its amplitude increasing as the frequency increases;
    an output terminal;
    a first transistor in the form of a common-emitter amplifier and a second transistor in the form of an emitter follower amplifier cascade-connected between said input and output terminals and each having base, emitter and collector electrodes;
    means for supplying said base electrode of said first transistor with said input signal applied to said input terminal;

means for connecting said emitter electrode of said second transistor to said output terminal;

means for connecting said collector electrode of said first transistor to said base electrode of said second transistor;

a negative feedback network connected between said emitter electrode of said first transistor and said emitter electrode of said second transistor and having its negative feedback level changed with a characteristic corresponding to the frequency chracteristic of said input signal; and an inductance element connected between said emitter electrode of said first transistor and said negative feedback network and having an impedance which is small for said input signal and large for a signal whose frequency is higher than that of said input signal in the high frequency range.

3. An equalizer amplifier comprising:

first and second transistors of the same conduction type each having base, emitter and collector electrodes with their emitter electrodes connected to one potential source through a common resistor and their collector electrodes connected to the other potential source to provide a differential amplifier;

a third transistor operating in the form of an emitter follower amplifier and having base, emitter and collector electrodes;

an input terminal receiving an audio frequency signal which has a frequency characteristic with its amplitude increasing as the frequency increases;

an input circuit connected between said input terminal and said base electrode of said first transistor for supplying said transistor with said input signal;

means for connecting said base electrode of said third transistor and said collector of either one of said first and second transistors;

a negative feedback network connected between said base electrode of said second transistor and said emitter electrode of said third transistor and having its negative feedback level changed with a characteristic corresponding to the frequency characteristic of said audio frequency signal;

an inductance element connected between said negative feedback network and said base electrode of said second transistor and having an impedance which is small for said audio frequency signal and large for a signal whose frequency is higher than that of said audio frequency signal in the high frequency range; and a capacitor connected to one end of said inductance element and the ground.

4. An equalizer amplifier according to claim 2 or 3, wherein a resistor is connected in parallel with said inductance element.

5. A low frequency amplifier comprising:

an input terminal receiving an input signal which has a frequency characteristic with its amplitude increasing as the frequency increases;

a first transistor operating in the form of a common emitter amplifier and having base, emitter and collector electrodes;

a second transistor operating in the form of an emitter follower amplifier and having base, emitter and collector electrodes;

a second inductance element connected between said input terminal and said base electrode of said first transistor for supplying said first transistor with said input signal;

means connected between said collector electrode of said first transistor and said base electrode of said second transistor for supplying said second transistor with an output signal from said first transistor;

a negative feedback network connected between said emitter electrode of said first transistor and said emitter electrode of said second transistor and having its feedback level changed with a characteristic corresponding to the frequency characteristic of said input signal; and a first inductance element connected between said emitter electrode of said first transistor and said negative feedback network.

6. A low frequency amplifier according to claim 5, wherein a resistor is connected in parallel with said first and second inductance elements, respectively.

7. A low frequency amplifier comprising:

first and second transistors of the same conduction type each having base, emitter and collector electrodes with their emitter electrodes connected to one potential source through a common resistor and their collector electrodes connected to the other potential source to provide a differential amplifier;

a third transistor operating in the form of an emitter follower amplifier and having base, emitter and collector electrodes;

an input terminal receiving an input terminal which has a frequency characteristic with its amplitude increasing as the frequency increases;

a second inductance element connected between said input terminal and said base electrode of said first transistor for supplying said first transistor with said input signal;

means connected between said base electrode of said third transistor and said collector electrode of either one of said first and second transistors for supplying said third transistor with an output signal from said one of the transistors;

a negative feedback network connected between said emitter electrode of said third transistor and said base electrode of said second transistor and having its feedback level changed with a characteristic corresponding to the frequency characteristic of said input signal;

a first inductance element connected between said base electrode of said second transistor and said negative feedback network; and a capacitor connected between one end of said first inductance element and the ground.

8. A low frequency amplifier according to claim 7, wherein a resistor is connected in parallel with said first and second inductance elements, respectively.

* * * * *